United States Patent [19]

Pommier

[11] 4,271,890
[45] Jun. 9, 1981

[54] RADIAL CARCASS TIRE OF LARGE WIDTH EMPLOYING TWO AXIALLY-SPACED CARCASS EXPANSION LIMITING BLOCKS

[75] Inventor: Jean Pommier, Clermont-Ferrand, France

[73] Assignee: Compagnie Generale des Etablissements Michelin, Clermont-Ferrand, France

[21] Appl. No.: 117,029

[22] Filed: Jan. 30, 1980

Related U.S. Application Data

[63] Continuation-in-part of Ser. No. 19,183, Mar. 9, 1979, abandoned.

[30] Foreign Application Priority Data

Mar. 10, 1978 [FR] France .............................. 78 07389

[51] Int. Cl.³ .......................... B60C 9/08; B60C 9/20
[52] U.S. Cl. .......................... 152/352 R; 152/354 R; 152/359; 152/361 FP; 152/361 DM
[58] Field of Search ........... 152/352, 353, 354, 361 R, 152/361 FP, 361 DM, 359

[56] References Cited

U.S. PATENT DOCUMENTS

| | | | |
|---|---|---|---|
| 2,884,040 | 4/1959 | Boussu et al. ................... | 152/361 R |
| 2,939,502 | 6/1960 | Hindin et al. ........................ | 152/352 |
| 3,018,814 | 1/1962 | Saint-Paul ..................... | 152/361 FP |
| 3,515,197 | 6/1970 | Boileau ............................ | 152/361 R |
| 3,899,015 | 8/1975 | Gebert et al. .................. | 152/361 FP |
| 4,016,916 | 4/1977 | Ravagnani ...................... | 152/361 R |

FOREIGN PATENT DOCUMENTS

| | | | |
|---|---|---|---|
| 1460832 | 10/1966 | France ............................... | 152/361 FP |
| 808824 | 2/1959 | United Kingdom ............... | 152/361 R |

*Primary Examiner*—John E. Kittle
*Assistant Examiner*—Lois E. Boland
*Attorney, Agent, or Firm*—Brumbaugh, Graves, Donohue & Raymond

[57] ABSTRACT

A tire having a ratio H/B at most equal to 0.75, H being the radial height of the tire on its rim and B the maximum axial width of the tire, is improved due to the fact that between the radial carcass reinforcement and the tread reinforcement there are arranged two limiting blocks which are located on opposite sides of the equatorial plane. Each limiting block is formed of two superimposed crossed plies of wires or cables of low extensibility which form with the longitudinal direction angles of opposite sign, each being both other than zero and less than one-half of the smallest angle used in the tread reinforcement.

17 Claims, 8 Drawing Figures

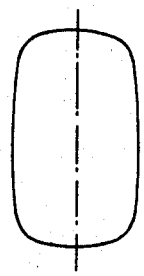
FIG. 1A
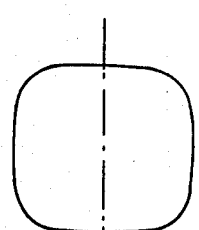
FIG. 1B
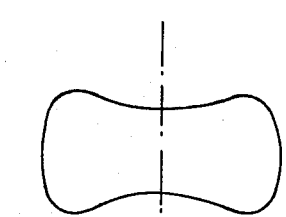
FIG. 1C
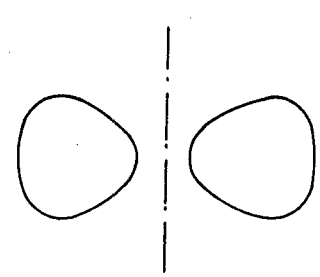
FIG. 1D
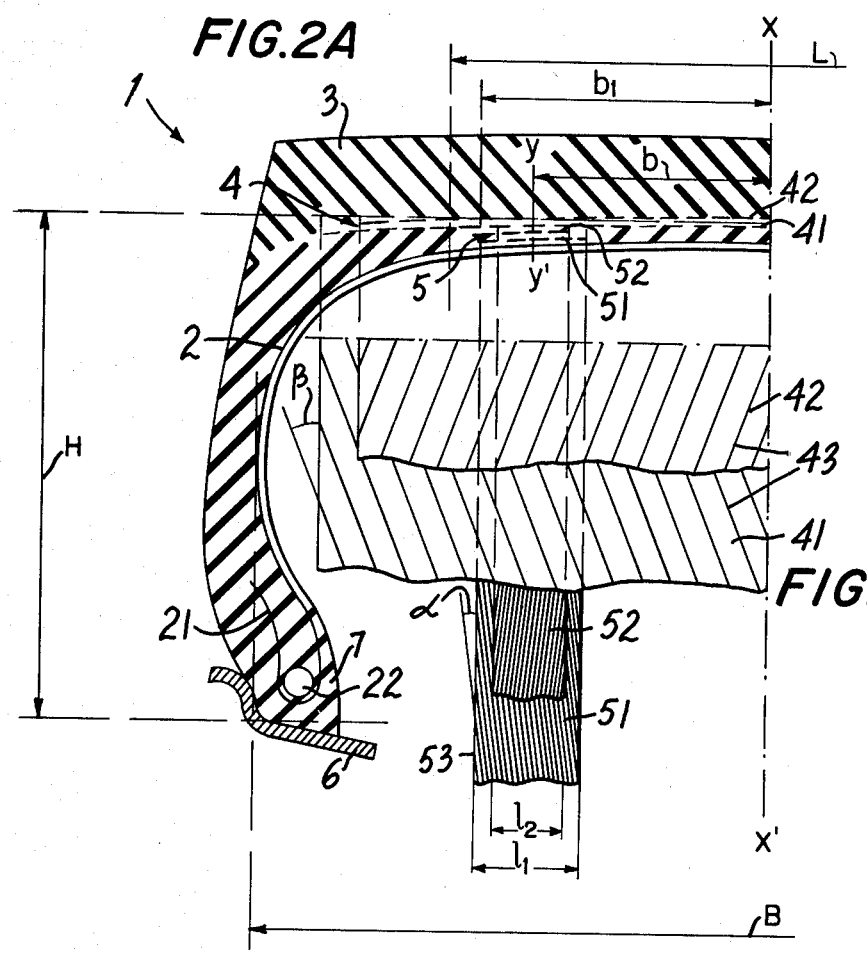
FIG. 2A
FIG. 2B
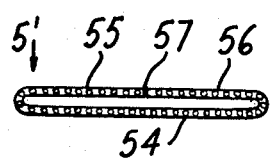
FIG. 3
FIG. 4

RADIAL CARCASS TIRE OF LARGE WIDTH EMPLOYING TWO AXIALLY-SPACED CARCASS EXPANSION LIMITING BLOCKS

This application is a continuation-in-part application of U.S. application Ser. No. 19,183, filed Mar. 9, 1979, now abandoned.

The present invention relates to improvements in tires with a radial carcass reinforcement anchored on both sides to at least one bead ring and with a tread reinforcement of slight meridian curvature which is parallel to the radial carcass reinforcement along an equatorial zone and formed of at least two superimposed plies of wires or cables parallel in each ply and crossed from one ply to the other and forming angles at most equal to 30° with the longitudinal direction of the tire.

When the maximum axial width B of such tires is increased without increasing the diameters at the equator and at the bead seats on the rim, that is to say retaining the radial height H of the tire on its rim, it is found that the area of contact with flat horizontal ground changes considerably in shape for a ratio H/B decreasing between 1 and 0.5 and below, despite the use of a tread reinforcement with reinforced edges. The area of contact increases in the axial direction but decreases in the longitudinal direction of the tire. The shortening in the longitudinal direction entails an increasingly greater shrinkage in the equatorial zone up to the moment that the shrinkage causes the front and rear edges of the contact area to meet and then the division of the contact area into two separate areas which are symmetrical with respect to the longitudinal axis of the tread.

Despite the advantages presented by wide treads and tires having a ratio H/B considerably less than unity (improvement in road holding, resistance to wear, lateral stability, etc.) the equatorial shortening and then the division of the contact area starting from a ratio H/B at most equal to 0.75 presents a number of drawbacks such as, for instance, poor adherence of the equatorial zone of the tread or a localizing of high pressures in the region of the edges of the tread.

This would appear to be caused by the local increase of the diameter of the radial carcass reinforcement. It tends to assume its meridian equilibrium profile in the sidewalls, at the shoulders and under the edges of the tread reinforcement due to the effect of the inflation pressure. The increase of the marginal diameters of the tread reinforcement places the marginal zones of the tread reinforcement under stress. This tension stress results in shearing between the crossed piles. This shearing adds onto that caused by the travel of the tire and reduces the life of the tread reinforcement.

In order to overcome these drawbacks, the present invention contemplates providing two limiting blocks which cover two zones spaced from the equatorial plane of the tire of the type in question and included within the equatorial zone along which the radial carcass reinforcement and the tread reinforcement are parallel, and between these two reinforcements, each limiting block being formed of two superimposed plies of wires or cables of low extensibility which are parallel to each other in each ply and crossed from one ply to the other forming with the longitudinal direction angles of opposite sign, each being both other than zero and less in absolute value than one-half of the smallest angle used in the tread reinforcement.

By wires or cables of low extensibility there are understood wires or cables, preferably metallic, for instance of steel, having a relative elongation $(\Delta l)/(l)$ less than 0.2% under a load equal to 10% of their rupture load. These cables may be made with a high cable lay of between 12 and 20 times the apparent diameter of the cable. These wires or cables of the two limiting blocks are preferably arranged contiguous to each other in each ply.

In order to screen off as well as possible the transmission of tensions coming from the pressure of the radial carcass reinforcement and taking into account the fact that no ply reinforcement element, even of steel or of glass fiber, is inextensible in actual practice, the invention provides for arranging the reinforcement elements of the plies of the two limiting blocks at an angle other than zero with respect to the longitudinal direction. The crossed plies have in fact a tendency to decrease the meridian curvature of the two limiting blocks under the effect of an internal pressure.

The tension T per unit of width measured in the axial direction exerted on a ply by the radial carcass reinforcement can be evaluated in first approximation by means of the formula $T = p \cdot [R/(2 \cos^2 \alpha)]$. In this formula, p is the inflation pressure of the tire, R is the radius of the ply with respect to the axis of rotation of the tire and $\alpha$ is the angle of the cables of the ply with the longitudinal direction. This formula indicates why the invention contemplates use in the two limiting blocks of angles $\alpha$ less than one-half of the smallest angle used in the tread reinforcement. Thus the tension T of a ply of the two limiting blocks is always less than the tension of the ply having the smallest angle in the tread reinforcement. The elongation of the two limiting blocks under the effect of the tension coming from the carcass reinforcement is thus less. This avoids transmitting this tension to the tread reinforcement.

Preferably the width of each limiting block is between 15% and 45% of the width of the equatorial zone along which the tread reinforcement is parallel to the radial carcass reinforcement. The longitudinal median axes of the two limiting blocks are at a distane from each other which is between 50% and 80% of the width of the equatorial zone along which the tread reinforcement is parallel to the radial carcass reinforcement. This makes it possible to maintain their outer edges within zones of low deformability.

The transition between the edges of each limiting block and the radial carcass and tread reinforcements can be improved by using two plies whose widths differ from each other by at most 10%. However, each of the two limiting blocks can also be formed by means of a ply whose edges are folded so as to meet along a parallel circle, or which is folded on itself.

If it is desired to make the tread flexible without losing the advantage of the invention, it has been found preferable to reduce the width of each limiting block rather than to divide each limiting block into two sub-blocks which are adjacent but separated by an interruption of slight width.

The two limiting blocks designed and arranged in accordance with the invention take up the tensions caused by the radial thrust of the radial carcass reinforcement. They absorb, on the one hand, the shearing stresses caused by the inflation of the tire. On the other hand, they make it possible to eliminate the shrinkage of the area of contact with the ground and the drawbacks which result therefrom.

The invention overcomes the above-described drawbacks of the tires of the type in question, whether they are intended to equip high-speed or racing vehicles or heavy equipment and very large carriers such as earth-moving equipment.

In the drawing, which is intended to illustrate the invention by means of practical embodiments:

FIG. 1 schematically shows the change of the contour of the area of contact of a tire as a function of the value of the ratio H/B, FIG. 2A shows one-half of a tire provided with a limiting block formed of two plies, seen in radial section, alongside of which in FIG. 2B is a plan view of the plies, essential for an understanding of the invention, and FIGS. 3 and 4 are views in radial section on a larger scale through limiting blocks composed of a single folded ply.

In FIG. 1, which is subdivided into 1A, 1B, 1C and 1D, there is shown the contour of four areas of contact of an ordinary tire for four different values of the ratio H/B (radial height H of the tire on its rim at the maximum axial width B of the tire, see FIG. 2A). The contact area of 1A corresponds to a ratio H/B equal to 1, the contact area of 1B corresponds to a ratio H/B of 0.8, the contact area of 1C corresponds to a ratio H/B of 0.65 and the contact area of 1D corresponds to a ratio H/B of 0.5.

In the half-section shown in FIG. 2A, the tire 1 comprises a radial carcass reinforcement 2, a tread 3, a tread reinforcement 4, and a limiting block 5 which is arranged in accordance with the invention between the radial carcass reinforcement 2 and the tread reinforcement 4. The ratio of the radial height H of the tire 1 on its rim 6 (partially shown), measured at the level of the tread reinforcement 4, to the maximum axial width B of the tire, measured at the radial carcass reinforcement 2, is equal to 0.5.

For clarity of the drawing, the wires or cables of the tread reinforcement 4 are represented, in the plan view (FIG. 2B) adjacent the radial section (FIG. 2A), by straight lines 43 which are spaced widely apart from each other. The wires or cables of the plies 51, 52 forming the limiting block 5 are shown in the same manner, but the lines are closer together in order to point out that preferably each of these plies 51 and 52 is formed of wires or cables which are contiguous to each other.

The edge 21 of the radial carcass reinforcement 2 is turned up towards the outside around the bead ring 22 of the bead 7. In the example, the radial carcass reinforcement 2 is formed of a single ply of steel cables. The tread reinforcement 4 is formed of two crossed plies 41, 42 of steel cables, each forming an angle $\beta$ at most equal to 30° with the longitudinal direction. Protective plies (not shown) of elastic cables can be arranged radially outward of the tread reinforcement 4. The limiting block 5 is formed of two crossed plies 51, 52, each forming an angle $\alpha$ less than one-half of the angle $\beta$ with the longitudinal direction. The width $l_2$ of the radially outer ply 52 is less than the width $l_1$ of the ply 51.

Along an equatorial zone (that is to say centered on the equatorial plane of trace X-X' in the plane of the drawing) of width L the tread reinforcement 4 is practically parallel to the radial carcass reinforcement 2. In this equatorial zone, the two reinforcements 2 and 4 have a relatively slight meridian curvature, for instance at most equal to the circumferential curvature of the tread reinforcement 4. The tread reinforcement 4 is of practically constant curvature. Its radial distance from the radial carcass reinforcement 2 increases towards the outside of the equatorial zone of parallelism of width L. In this example, L is equal to about 63% of the axial width B, L increasing as the ratio H/B decreases.

The longitudinal median axes Y-Y' of the limiting block 5 and of its symmetrical limiting block (not shown) with respect to the equatorial plane of trace X-X' each have an axial distance b from the equatorial plane. This distance b is less than one-half of the width L of the equatorial zone of parallelism between the radial carcass reinforcement 2 and the tread reinforcement 4. The width $l_1$ of each limiting block 5 is such that the axially outer edge 53 of the limiting block 5 (and of its symmetrical limiting block, not shown) is located at a distance $b_1$, less than one-half of the width L of the equatorial zone of parallelism, from the trace X-X' of the equatorial plane. In this example, this distance $b_1$ is equal to about 45% of the width L and the width $l_1$ is equal to about 16% of the width L.

FIG. 3 shows a radial section through a limiting block 5' formed of a ply 54 whose edges 55 and 56 are folded so as to meet along a parallel circle 57. It is also possible (FIG. 4) to form each limiting block by means of a ply 58 which is folded in two, that is to say folded on itself. The folded edge 59 is preferably arranged axially towards the outside of the tire.

Although in the foregoing and in the claims which follow reference is made to the smallest angle used in the plies of the tread reinforcement with respect to the longitudinal direction, the invention applies just as well in the case where the plies in question form equal angles (in absolute value) with said direction, so that the angle which the wires or cables of each of the two limiting blocks form with the longitudinal direction must be smaller than the angle (and not the smallest angle) of the plies of the tread reinforcement.

It is also useful to employ two limiting blocks 5 each consisting of two plies 51, 52, the wires or cables of which make different angles $\alpha$ in absolute value while remaining of opposite sign. The advantage of such asymmetrical arrangement is to correct, if necessary, lateral (axial) nonuniformity thrusts induced by the tread reinforcement 4, or to prevent, especially in cases where relatively wide limiting blocks are used, the generation of such nonuniformity thrusts by the limiting blocks 5 themselves. These thrusts may distrub the vehicle behavior and cause uneven wear of the tread 3.

In fact, limiting blocks 5 formed by two symmetrically disposed plies 51, 52 (e.g., at angles $+\alpha$ and $-\alpha$) basically generate such harmful thrusts, because the two plies 51, 52 are not located at the same distance from the axis of rotation of the tire 1. Consequently, limiting blocks 5 which do not generate lateral thrusts have their wires or cables disposed at asymmetrical angles $\alpha$. By preference, the limiting block-ply 51, the wires or cables of which are oriented at the greater angle $\alpha$ should be disposed radially inside the other ply 52. A satisfactory angular arrangement is thus 8° for the radially inner ply 51 and 3° for the radially outer ply 52.

When the limiting blocks such as 5 are formed by symmetrically disposed plies such as 51, 52 the absolute value of angle $\alpha$ is preferably between 5° and 10°.

What is claimed is:

1. A tire having a ratio H/B at most equal to 0.75, H being the radial height of the tire on its rim and B the maximum axial width of the tire, with a radial carcass reinforcement anchored on both sides to at least one bead ring and with a tread reinforcement of slight meridian. curvature which is parallel to the radial carcass reinforcement along an equatorial zone and formed of at least two superimposed plies of wires or cables parallel in each ply and crossed from one ply to the other forming angles at most equal 30° with the longitudinal direction of the tire, characterized by the fact that between the radial carcass reinforcement and the tread reinforcement there are arranged two limiting blocks parallel to the radial carcass reinforcement and in two zones spaced from the equatorial plane of the tire and included within the equatorial zone along which the tread reinforcement is parallel to the radial carcass reinforcement, each limiting block being arranged along one of said two zones and each limiting block being formed of two superimposed plies of wires or cables of low extensibility which are parallel to each other in each ply and crossed from one ply to the other forming with the longitudinal direction angles of opposite sign, each being both other than zero and less in absolute value than one-half of the smallest angle used in the tread reinforcement and wherein the wires or cables of low extensibility of the limiting blocks have a relative elongation less than 0.2% under a load equal to 10% of their rupture load.

2. The tire according to claim 1, characterized by the fact that the opposite angles formed by the wires or cables of the two plies of each limiting block are asymmetrical with the longitudinal direction of the tire.

3. The tire according to claim 2, characterized by the fact that the wires or cables of the radially inner ply of each limiting block form a greater angle than that of the wires or cables of the radially outer ply of the same limiting block.

4. The tire according to claim 3, characterized by the fact that the angle of the wires or cables of the radially inner ply is 8° and the angle of the wires or cables of the radially outer ply is 3° in absolute value.

5. The tire according to claim 1, characterized by the fact that the opposite angles formed by the wires or cables of the two plies of each limiting block are symmetrical with the longitudinal direction of the tire.

6. The tire according to claim 5, characterized by the fact that the opposite symmetrical angles formed by the wires or cables of the two plies of the two limiting blocks are between 5° and 10° in absolute value.

7. The tire according to claim 2 or claim 5, characterized by the fact that the cables of the two limiting blocks have a cable lay of between 12 and 20 times the apparent diameter of the cable.

8. The tire according to claim 2 or claim 5, characterized by the fact that the wires or cables of the two limiting blocks are arranged contiguous to each other.

9. The tire according to claim 2 or claim 5, characterized by the fact that the width of each limiting block is between 15% and 45% of the width of the equatorial zone along which the tread reinforcement is parallel to the radial carcass reinforcement.

10. The tire according to claim 2 or claim 5, characterized by the fact that the longitudinal median axes of the two limiting blocks are at a distance from each other which is between 50% and 80% of the width of the equatorial zone along which the tread reinforcement is parallel to the radial carcass reinforcement.

11. The tire according to claim 2 or claim 5, characterized by the fact that one of the plies of each limiting block is narrower than the other ply, the difference in width being at most equal to 10% of the widest ply.

12. The tire according to claim 5, characterized by the fact that each limiting block is formed of a ply whose edges are folded so as to meet along a parallel circle.

13. The tire according to claim 5, characterized by the fact that each limiting block is formed of a ply which is folded on itself, the folded edge being preferably arranged axially towards the outside of the tire.

14. The tire according to claim 2 or claim 5, characterized by the fact that the tread reinforcement has a slight meridian curvature at most equal to its circumferential curvature in the equatorial zone along which the tread reinforcement is parallel to the radial carcass reinforcement.

15. The tire according to claim 2 or claim 5, characterized by the fact that the tread reinforcement is of practically constant curvature.

16. The tire according to claim 2 or claim 5, characterized by the fact that the two limiting blocks are equidistant from the equatorial plane of the tire.

17. The tire according to claim 2 or claim 5, characterized by the fact that the two limiting blocks are both of the same width.

* * * * *